(12) United States Patent
Sasso et al.

(10) Patent No.: US 9,855,563 B2
(45) Date of Patent: Jan. 2, 2018

(54) PROCEDURE FOR EFFICIENT RECOVERY OF DIAMONDS, GOLD FROM TAILINGS

(71) Applicant: Claudio Sasso, Bassano del Grappa (IT)

(72) Inventors: Claudio Sasso, Bassano del Grappa (IT); Mahendra Samaroo, Edmonton (CA)

(73) Assignee: Claudio Sasso, Bassano del Grappa (VI) (IT)

( * ) Notice: Subject to any disclaimer, the term of this patent is extended or adjusted under 35 U.S.C. 154(b) by 102 days.

(21) Appl. No.: 14/906,005

(22) PCT Filed: Jul. 21, 2014

(86) PCT No.: PCT/CA2014/000577
§ 371 (c)(1),
(2) Date: Jan. 19, 2016

(87) PCT Pub. No.: WO2015/006861
PCT Pub. Date: Jan. 22, 2015

(65) Prior Publication Data
US 2016/0158764 A1 Jun. 9, 2016

(30) Foreign Application Priority Data

Jul. 19, 2013 (GB) .................................. 1313093.5

(51) Int. Cl.
*B03B 9/00* (2006.01)
*C22B 1/00* (2006.01)
(Continued)

(52) U.S. Cl.
CPC ................. *B03B 9/00* (2013.01); *B07B 1/18* (2013.01); *C22B 1/00* (2013.01); *C22B 11/021* (2013.01);
(Continued)

(58) Field of Classification Search
CPC .... B03B 5/00; B03B 5/48; B03B 5/52; B03B 7/00; B03B 9/00; B03B 9/02; B03B 13/005; C22B 11/04; B01D 21/267
See application file for complete search history.

(56) References Cited

U.S. PATENT DOCUMENTS 2,325,149 A * 7/1943 Rakowsky ............... B03C 1/00
209/172.5
2,932,395 A * 4/1960 Marot ..................... B03B 5/447
209/172.5

(Continued)

FOREIGN PATENT DOCUMENTS

CA 1202285 3/1986
CA 2084343 6/1994
(Continued)

*Primary Examiner* — Joseph C Rodriguez
(74) *Attorney, Agent, or Firm* — Anthony Asquith Corp.

(57) ABSTRACT

The value-minerals are captured by gravity-separation, from a low-grade slurry. The ratio of liquids-to-solids in the slurry affects the efficiency of capture, and an ideal liquids/solids ratio is the ratio at which the efficiency of capture is at a maximum. The ideal ratio is different for different particle-sizes. The procedure includes dewatering the slurry, dividing the dry particles by particle-size, and feeding the several size-divided dry-streams into respective capture-stations. Prior to each dry-stream entering its respective capture-station, make-up water is added to the dry-stream in such quantity as to bring the liquids/solids ratio up to the ideal, for that particle-size. The procedure makes it simple to provide accurate measurement of, and accurate control of, the liquids/solids ratio.

12 Claims, 3 Drawing Sheets

(51) Int. Cl.
*C22B 11/02* (2006.01)
*B07B 1/18* (2006.01)
*B03B 5/48* (2006.01)
*B03B 7/00* (2006.01)

(52) U.S. Cl.
CPC . *B03B 5/48* (2013.01); *B03B 7/00* (2013.01); *Y02P 10/214* (2015.11)

(56) References Cited

U.S. PATENT DOCUMENTS

| | | | | |
|---|---|---|---|---|
| 3,247,961 A * | 4/1966 | Chase | ............... | B03B 13/005 209/1 |
| 4,028,228 A * | 6/1977 | Ferris | ............... | B03B 5/34 209/172.5 |
| 4,164,467 A * | 8/1979 | Liller | ............... | B03B 9/005 209/10 |
| 4,416,768 A * | 11/1983 | Nosseir | ............... | B03B 5/626 209/3 |
| 4,554,066 A * | 11/1985 | Turbitt | ............... | B03B 5/623 209/159 |
| 5,236,089 A * | 8/1993 | Smitham | ............... | B03B 5/34 209/1 |
| 5,794,791 A * | 8/1998 | Kindig | ............... | B03B 5/34 209/12.1 |
| 6,599,434 B2 * | 7/2003 | Mullins | ............... | B03B 9/005 209/12.1 |
| 8,393,561 B2 * | 3/2013 | Bjornson | ............... | B03B 9/02 241/100 |
| 2005/0134102 A1 * | 6/2005 | Cymerman | ............... | E02F 1/00 299/7 |
| 2006/0196814 A1 * | 9/2006 | Vince | ............... | B03B 9/005 210/85 |
| 2009/0031862 A1 * | 2/2009 | Ourriban | ............... | C22B 1/00 75/744 |
| 2009/1031862 | 2/2009 | Ourriban et al. | | |
| 2013/0075506 A1 * | 3/2013 | Bjornson | ............... | B03B 9/02 241/43 |
| 2016/0160317 A1 * | 6/2016 | Kumar | ............... | B03B 7/00 435/283.1 |
| 2016/0376680 A1 * | 12/2016 | Abuhasel | ............... | C02F 3/322 75/711 |
| 2017/0151573 A1 * | 6/2017 | Coomer | ............... | B03B 7/00 |

FOREIGN PATENT DOCUMENTS

| | | |
|---|---|---|
| CA | 2321703 | 9/1999 |
| CN | 102489384 | 12/2011 |

* cited by examiner

PROCEDURE FOR EFFICIENT RECOVERY OF DIAMONDS, GOLD FROM TAILINGS

This technology relates to the recovery of alluvial gold and diamonds from a source slurry. The slurry may be derived from placer ore that has been mined by a suction dredge or hydraulicking, or slurry derived from tailings from a previous mining operation. Generally, the source slurry contains gravel, sands, silts, cemented lateritic material, clays. These terms refer to the sizes of the solid particles in the slurry, and the slurry may contain larger particles which may be termed 'stones', 'rocks', and the like.

A general characteristic of such slurries is that the proportion of water and solids in the slurry varies a great deal, and the sizes of the particles, and the mix of the sizes of the particles, also varies a great deal, over different parts of the slurry. The liquids content of the slurry should be dilute enough to simplify transportation of the solids fraction to the processing plant, without settling during transportation.

The irregular variations in the ratio of water to solids in the slurry reduce the effectiveness of gravity processing technology, and the effectiveness of recovery of gold and diamonds from this slurry. The efficiency with which small particles of value-minerals (e.g gold, diamonds, platinum group minerals) can be captured from the slurry is enhanced when the liquids-solids ratio of the slurry is at an optimum level. That is to say: when the liquids-solids ratio is at the optimum level for the particular capture-station, fewer particles will escape capture than when the liquids-solids ratio is not at the optimum level. (The 'liquids-to-solids ratio' of a slurry is often referred to as the 'density' of the slurry.)

The optimum level of the liquids-solids ratio depends on the particular equipment at the capture-station, and depends also on the sizes of the particles in the slurry. Thus, the optimum liquids-solids ratio for efficiently capturing grains of value-minerals from a slurry having predominantly gravel-sized particles, is likely to be significantly different from the optimum ratio for capturing grains from predominantly pebble-sized particles.

The efficiency with which gold and diamonds can be captured, by gravity processing, from slurry can be affected by variations in the liquids-solids ratio, the clay content, surges in feed rates, and other factors.

Alluvial processing plants are typically not equipped for disaggregation and cannot process cemented lateritic ore material. Preferably, in the new technology, the incoming watery-slurry passes through equipment for disaggregating cemented lateritic materials.

One conventional technology for processing ore feed for the recovery of fine gold is by stabilizing the slurry density at the start of the process. This involves sending the dredged slurry (though size classification equipment) to a large slurry holding tank, which acts as a reservoir. Sediment is then pumped from the bottom of the tank, to create a slurry of constant density. Excess water is usually decanted from the top of this holding tank.

These tanks are usually large, heavy and require high pressure venturi systems (which use high pressure water to transport the slurry) or slurry handling pumps to extract and move the slurry along to other parts of the process. The slurry created usually has a stable solids to liquids ratio.

These conventional processes have limitations when applied to small dredge mining operations (under 500 cu·meters/hr). Slurry holding tanks are required as part of the feed preparation at the start of each unit process. In the case of gravity and centrifuge processing equipment the slurry density must be carefully controlled for the subsequent capture process to be done efficiently. This can be done in larger operations where it is economical to provide electronic controls and active feedback processes, but not in small mining operations.

Generally, in the conventional value-mineral capture plants, the incoming watery slurry remains as a watery slurry throughout all the processing operations. The present technology basically dewaters and then rewaters the slurry. This enables the liquids-solids ratio of the rewatered slurry to be accurately determined and controlled. Thus, the slurry having been divided into several streams based on particle size, the technology enables the liquids-solids ratio to be accurately optimized for each stream. The resulting improved capture efficiency can greatly benefit the economics of the capture operation.

The new technology aims to provide a cost-effective procedure for ensuring slurry is at its optimum liquids-solids ratio upon being passed into and through a value-capture-station—despite the incoming watery-slurry being highly variable as to its density (i.e its liquids-solids ratio), its granulometry, its clay content, etc.

The new procedure involves increased handling of water, which might make the technology uneconomical in larger alluvial plants and operations, and so its preferred field is in the smaller-scale plants and operations that handle under five-hundred cubic meters of watery-slurry per hour.

Figure 1:
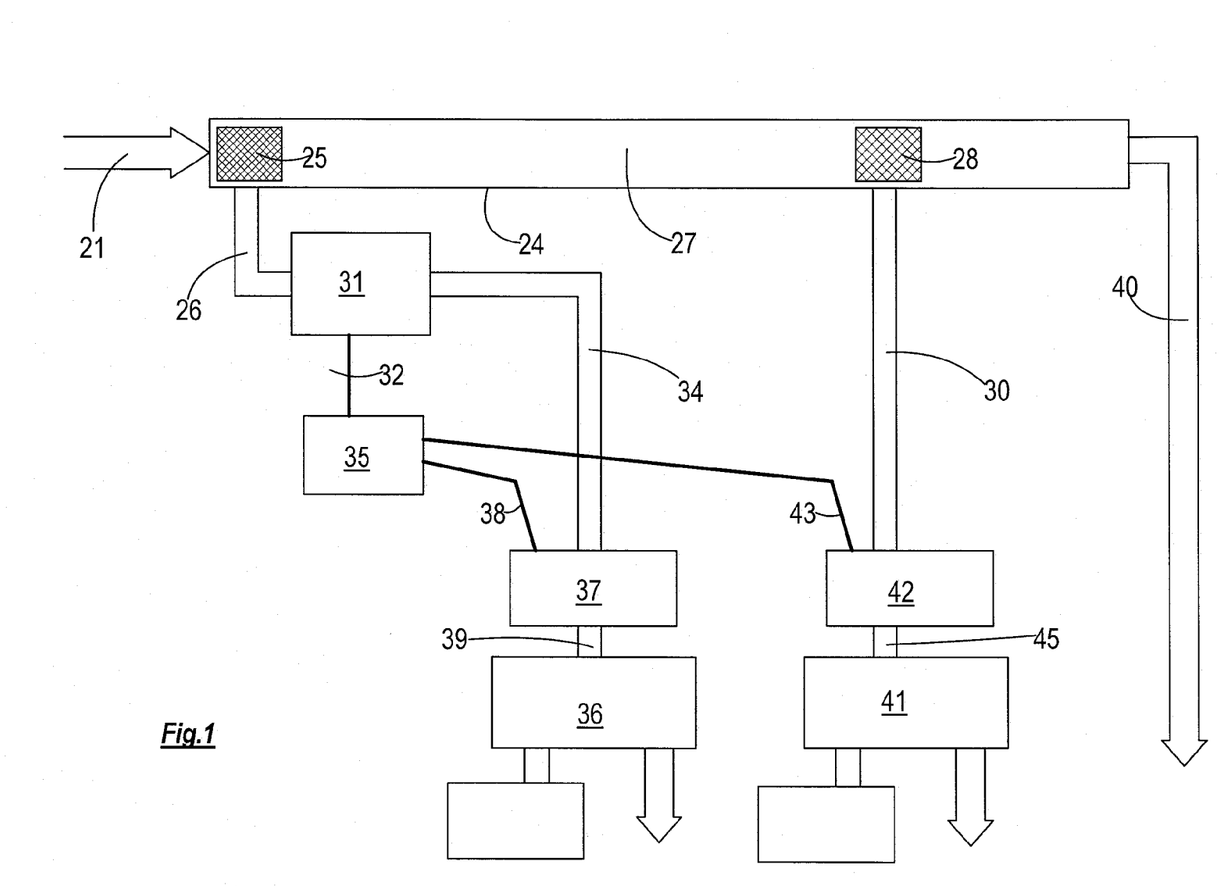
FIG. 1 is a schematic diagram of a basic installation and operation, in which a watery slurry, which contains value-minerals, is processed for capture of those minerals.

In FIG. 1, the components that make up the overall processing station 20 are, in themselves, of conventional structure and operation, and will not be described in detail. The arrangement of, and interaction between, the conventional components is new, and it is this new arrangement that gives rise to the beneficial technical effects as described herein.

In operations to which FIG. 1 applies, the incoming watery-slurry 21 may be characterized as follows. In one example, only a few of the solid particles in the slurry 21 have a diameter larger than e.g twelve millimeters. This can arise when the (large majority of) particles occurring naturally at the site are smaller than twelve mm.

The watery-slurry 21 is a mixture of solid particles suspended in water. The presence of copious water in the watery-slurry 21 means that the watery-slurry can be transported simply by gravity, i.e the water flows along and through launders, troughs, conduits, etc, by gravity (no power needed), and the solids are carried along with the water. Slurry that has been dewatered (herein called dry-slurry) typically has to be transported by means of powered conveyors, powered pumps, etc.

'Watery', in this context, means that the liquids-solids ratio of the slurry 21 is more watery than fifty percent liquids (by weight).

It is likely that the particles in the incoming watery-slurry 21 are not at all homogeneous as to particle size. As a generality, the sizes of particles can be categorized as, for example: sand—gravel—pebbles—stones—rocks—boulders. These words do not define specific particle-sizes as numerical measurements, but rather the words indicate a relative hierarchy of sizes, i.e gravel-particles are smaller than pebbles, and stones are smaller than rocks. The following is an example of a hierarchy of particle-size numbers that might be so described:

sand: under two mm; gravel: two to six mm; pebbles: six to twelve mm; stones: twelve to nineteen mm; rocks: nineteen to thirty-two mm; boulders: over thirty-two mm. Given this number hierarchy, in the FIG. 1 plant/operation, the proportion of particles in the watery-slurry 21 larger than pebbles would be relatively small.

The incoming watery-slurry 21 is fed into the sand-wet-divider, which in this case comprises sand-apertures 25 of the trommel 24. The sand-apertures enable sand-particles smaller than (in this exemplary case) two millimeters diameter, to pass through the walls of the trommel 24. Also, the loose-water present in the watery-slurry 21 passes out of the trommel xx through the sand-apertures 25. Thus, the resulting sand-wet-stream 26 is a mixture of sand-and-smaller particles together with (nearly) all the loose-water and some of the tight-water.

The sand-wet-stream 26 having passed out through the sand-apertures 25 of the trommel 24, particles larger than two millimeters (being the gravel, pebbles, etc) remain inside the trommel 24. The slurry that includes these gravel-plus particles, which remains inside the trommel 24, has thus been dewatered, i.e is dry-slurry. The gravel-plus-dry-stream 27 contains little or no loose-water, and few or no particles smaller than the size as determined by gravel-apertures 28 in the wall of the trommel 24.

'Loose-water', as that term is used herein, is water that can be (or has been) easily separated from the solids of the incoming watery-slurry 21. The remaining water content of the watery-slurry 21 is 'tight-water', being water that is attached more tenaciously to the solids, for example by capillary action, surface tension, or is otherwise bound up and resistant to being separated from the solids particles.

Often, in the kinds of slurry with which the present technology is concerned, the water content of the watery-slurry 21 typically is e.g 85% loose-water and 15% tight-water. It can be expected that the ratio will be different place-to-place, and might vary time-to-time.

In a typical case, the liquids-solids ratio of the watery-slurry 21 is 60% liquids (by weight). Thus, ten tonnes of the watery-slurry comprises four tonnes of solids, five tonnes of loose-water, and one tonne of (hard-to-remove) tight-water. After dewatering, of the ten tonnes of watery-slurry, the five tonnes of loose-water are gone, and the remaining dry-slurry comprises the four tonnes of solids bound up with the one tonne of tight-water.

In the present technology, typically only loose-water is removed from the watery-slurry, and no attempt is made to separate the tight-water from the solids. That is to say: throughout processing, the tight-water remains with the solids, as a component of the dry-stream. It may be noted that the volume of the dewatered five tonnes of the dry-stream (solids plus tight-water) is only about one third of the volume of the watery-slurry 21.

Passing the watery-slurry 21 into and through the sand-wet-divider (being the sand-apertures 25) creates the sand-wet-stream 26, comprising the smaller particles together with all the loose-water that has been separated from the slurry. Also created is the gravel-plus-dry-stream 27, comprising the larger particles, i.e the particles larger than sand, bound up with the tight-water. Only negligible remnants of loose-water should be left in the dry-stream—i.e a loose-water remnant that is negligible and insignificant from the standpoint of the new technology.

The gravel-plus-dry-stream 27, comprising the larger (plus-two-mm) particles and basically no loose-water, continues through the trommel 24 to a gravel-dry-divider of the trommel 24. Here, the dry particles of the gravel-plus-dry-stream 27 encounter the gravel-apertures 28, which enable particles smaller than e.g six mm to pass out of the trommel 24, in a gravel-dry-stream 30.

Upon emerging from the trommel 24, the sand-wet-stream 26 (i.e the stream comprising the under-two-mm (or minus-two-mm) solid particles together with all the water) passes to a water-separator 31. The water-separator 31 splits the sand-wet-stream 26 into a loose-water-stream 32 and a sand-dry-stream 34. The loose-water-stream 32 passes to a water-distributor 35, while the sand-dry-stream 34 passes into a sand-capture-station 36. The sand-capture-station 36 is the place where the value-particles (e.g of diamonds, platinum group minerals, and/or gold) are finally captured from the sand-stream.

Just before the sand-dry-stream 34 enters the sand-capture-station 36, the sand-dry-stream 34 passes through a sand-water-adding-station 37. Here, make-up sand-water 38 from the water-distributor 35 is added to the sand-dry-stream 34, thereby converting the sand-dry-stream into a sand-rewatered-stream 39. It is the sand-rewatered-stream 39 that passes through, and is processed in, the sand-capture-station 36.

The operators should see to it that the amount of make-up sand-water 38 that is added to the sand-dry-stream 34 is such as to bring the density (i.e the liquids/solids ratio) of the sand-rewatered-stream 39 up to its optimum level. The optimum ratio is the ratio that, being present in the sand-rewatered-stream 39, maximizes the efficiency with which the sand-capture-station 36 captures the value-minerals from the sand-rewatered-stream 39.

The dewatered gravel-plus-dry-stream 27 remaining in the trommel 24 passes from the sand-wet-divider (in this case, the sand-apertures 25) into a gravel-dry-divider (in this case, the gravel-apertures 28), which is also a component of the trommel 24. The gravel-apertures 28 enable gravel-particles smaller than (in this case) six millimeters diameter to pass through the walls of the trommel 24. Thus, upon passing through the gravel-dry-divider, the gravel-plus-dry-stream 27 is divided into the gravel-dry-stream 30 and a pebbles-plus-dry-stream 40.

The gravel-dry-stream 30 passes into a gravel-capture-station 41. The gravel-capture-station 41 is the place where the value-particles are finally captured from the gravel-stream. The particles from the gravel-plus dry-stream 27 that do not make it through the gravel-apertures 28 pass out of the gravel-dry-divider (i.e pass out of the end of the trommel 24). The gravel-plus dry-stream 27 comprises the pebbles and such larger-sized particles as are present in the slurry 21. In the operation of FIG. 1, these larger particles are considered not to be worth processing to recover value-minerals, and are disposed of as tailings.

Just before the gravel-dry-stream 30 enters the gravel-capture-station 41, the gravel-dry-stream passes through a gravel-water-adding-station 42. Here, make-up gravel-water 43 from the water-distributor 35 is added to the gravel-dry-stream 30, thereby converting the gravel-dry-stream into a gravel-rewatered-stream 45. It is the gravel-rewatered-stream 45 that passes through, and is processed in, the gravel-capture-station 41.

The operators should see to it that the amount of make-up gravel-water 43 that is added to the gravel-dry-stream 30 is such as to bring the liquids/solids ratio of the gravel-rewatered-stream 45 up to its optimum level. The optimumgravel-ratio is the ratio that, being present in the gravel-rewatered-stream 45, maximizes the efficiency with which the gravel-capture-station 41 captures the value-minerals from the gravel-rewatered-stream 45.

The sand-rewatered-stream 39 and the gravel-rewatered-stream 45 now being at their respective optimum-ratios, the two streams are processed through their respective capture-stations 36,41, where capture of the value-minerals from the streams takes place.

In the FIG. 1 plant, the dewatering of the water-slurry is accomplished in two steps. First, the loose-water is removed from the incoming watery-slurry 21 by the fact that the loose-water passes out of the trammel 24 through the sand-apertures 25, as a component of the sand-wet-stream 26. Thus, the dewatering step that creates the gravel-plus-dry-stream 27 takes place in the sand-apertures 25.

The second dewatering step serves to remove the loose-water from the sand-wet-stream 26, thereby creating the sand-dry-stream 34. This is done in the water-separator 31. Here, typically, first the very fine particles (e.g minus-forty microns) are removed from the sand-wet-stream 26 e.g by conventional hydrocycloning. The minus-forty particles include clay and silt particles, which, if left in the water, would or might clog the capture equipment. These fine particles are disposed of, to the tailings pond. Of course, specks of gold or diamonds smaller than forty microns would be disposed of along with the clay particles, but typically it is not economical to provide an operation for capturing such small specks.

The hydrocycloned sand-wet-stream now includes only particles sized between forty microns and two mm. This size-range-limited sand-wet-stream is now dewatered, in the water-separator 31, e.g by the use of conventional high-frequency vibrating screens. The loose-water is separated out, thereby creating the sand-dry-stream 34. The separated loose-water-stream 32 is conveyed to the water-distributor 35.

The sand-dry-stream 34 comprises the forty-micron-to-two-mm solid particles together with the tight-water bound thereto. The sand-dry-stream 34 is conveyed to the sand-capture-station 36, passing though the sand-water-adding-station 37, just prior to entering the sand-capture-station 36, where make-up sand-water 38 from the water-distributor 35 is added, in order to bring the density of the sand-rewatered-stream 39 up to the sand-optimum-density.

Figure 2:
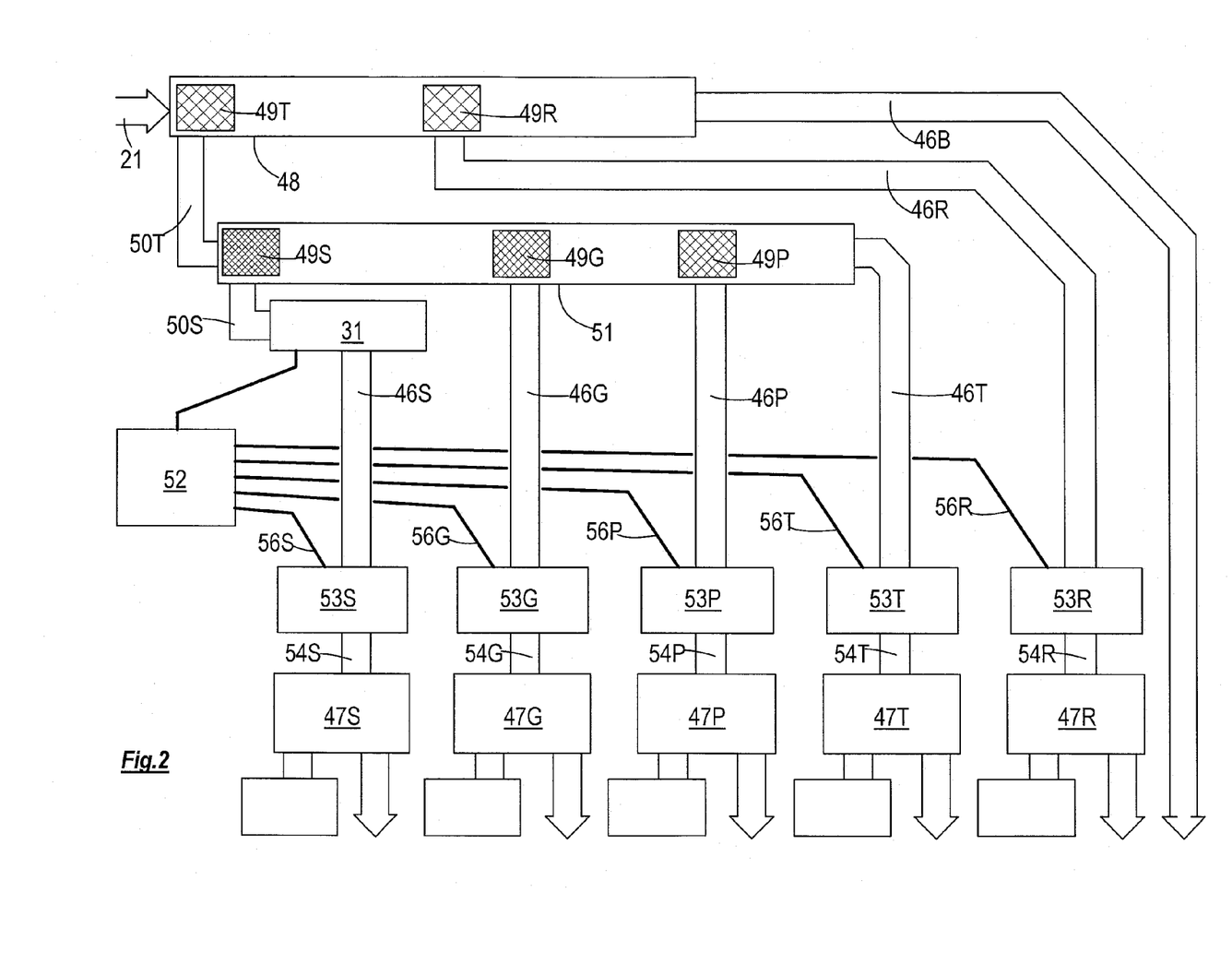
FIG. 2 is a similar diagram of a more elaborate installation.

The processing plant 46 depicted diagrammatically in FIG. 2 is for use when the range of particle sizes in the incoming watery-slurry 21 is wider, and significant fractions of each of sand, gravel, pebbles, stones, rocks, boulders are present in the slurry.

The capture operations in the FIG. 2 station are basically the same as in FIG. 1, except that the incoming slurry is divided into six dry-streams 46, rather than the two dry-streams 30,34 of FIG. 1. These are the sand-dry-stream 46S, the gravel-dry-stream 46G, the pebbles-dry-stream 46P, the stones-dry-stream 46S, the rocks-dry-stream 46R, and the boulders-dry-stream 46B. Five of the dry-streams 46 (other than the boulders-dry-stream 46B) feed into five respective capture-stations 47S,47G,47P,47N,47R.

The motivation for dividing the slurry into the six different particle-size categories is to improve the efficiency with which the value-minerals can be captured from the slurry. Each size-category is provided with its own components and its own capture-station.

The several particle-size categories have different liquids-solids ratios as their respective optimum ratios. Dewatering the slurry and dividing the dry-streams 46, and then indi- vidually rewatering the still-separated dry-streams, prior to capture processing, provides a simple manner of accurately controlling the liquids-solids ratio in the several rewatered streams that enter and pass through the respective capture-stations 47. There is no need for sophisticated sensing and control equipment, and the plant can be kept running as the designers intended by relatively untrained and unskilled operatives. The new technology provides a simple, unsophisticated system by which the liquids-solids ratio can be accurately controlled individually in each one of several particle streams.

The question how many particle-size categories the slurry should be divided into will now be discussed.

Consider a particular processing plant that already has N separated particle-size categories, and the question arises whether to include one more division, whereby the processing station now includes N+1 size-categories, and N+1 capture-stations. This question would be addressed as follows.

(A) In the particular plant, one of the ranges of sizes handled by the existing capture-stations is e.g twelve mm to thirty mm, and the question is whether to add an extra divider, and an extra capture-station. Doing so will enable the liquids-solids ratio for e.g the twelve-to-nineteen-mm range of particle-sizes to be different from the liquids-solids ratio for the particles in the nineteen-to-thirty-mm range.

(B) The systems-engineers ascertain the costs of adding and operating the extra divider and capture-station and associated components.

(C) The systems-engineers ascertain what is the optimum liquids-solids ratio for e.g the twelve-to-nineteen-mm range of particles, and what is the optimum liquids-solids ratio for the nineteen-to-thirty-mm range of particles. This is done e.g by laboratory experiments and evaluations, using the actual slurry being processed.

(D) The systems-engineers ascertain the likely capture-rates of value-minerals, given the actual slurry being processed in/by the plant. They (a) ascertain the capture-rate of the existing single capture-station that handles the whole twelve-to-thirty-mm range of particles, operating at the existing best-compromise liquids-solids ratio, and (b) ascertain the two capture rates that can be attributed to the two separate capture stations, when each one operates at its respective optimum liquid/solids ratio, and (c) they compare the two cases.

(E) The decision whether to add the new stream and the new capture-station is made on the basis whether the improved recovery will more than pay for the addition.

In the case of the FIG. 2 plant, it was ascertained that there is sufficient difference between the optimum liquids-solids ratios of the different size-categories, to make dividing the slurry into six streams (and five capture-stations) commercially worthwhile. Thus, the improvement in capture-efficiency from dividing the slurry into six streams more than pays for the costs of dividing.

There is a diminishing-returns effect, in that adding further divisions would create only a marginal improvement in capture efficiency. There is also the point that, as the differences in the respective optimum liquids-solids ratio becomes smaller, the question arises whether the ratios can be provided and controlled with a required degree of accuracy. Thus, it only makes sense to divide the slurry into two sub-streams where there is a substantial difference between the optimum ratio as between the two sub-streams.

In the exemplary installation that is represented by FIG. 2, the optimum-ratios of liquids-solids to maximize capture efficiency in each of the five capture-stations were ascertained as:
sand (under two mm): 75/25 (liquids first);
gravel (two-to-six-mm): 60/40;
pebbles (six-to-twelve-mm): 70/30;
stones (twelve-to-nineteen-mm): 80/20;
rocks (nineteen-to-thirtytwo-mm): 80/20.
In the FIG. 2 plant, no capture-station was provided in respect of the 'boulders' size-category (above thirty-two-mm), and no attempt was made to recover value-minerals from that category.

In FIG. 2, two trommels are provided. The incoming watery-slurry 21 passes first through a coarse-trommel 48. Here, the watery-slurry 21 encounters stones-apertures 49N, which enable particles smaller than nineteen mm diameter to pass outside the trommel, along with the loose-water contained in the slurry. The stones-wet-stream 50N passes into and through a fine-trommel 51.

It is preferred to provide the two trommels 48,51, because the fine mesh that forms the small sand-apertures 49S is physically fragile, and might be damaged by the larger rocks and boulders. In FIG. 2, the rocks and boulders are filtered out before the slurry reaches the fragile sand-apertures 49S.

The rocks and boulders in the rocks-plus dry-stream 46R+46B) remain in the coarse-trommel 48. A rocks-dry-divider, in the form of rocks-apertures 49R in the wall of the coarse-trommel 48, divides the rocks-plus dry-stream 46R+46B into a rocks-dry-stream 46R and a boulders-dry-stream 46B.

The stones-wet-stream 50T enters the fine-trommel 51, and encounters a sand-wet-divider in the form of sand-apertures 49S. The resulting sand-wet-stream 50S passes to the water-separator 31, and the gravel-plus dry-stream remains in the fine-trommel 51, as described in relation to FIG. 1.

In the water-separator 31, the loose-water 32 in the sand-wet-stream 50S is separated out, and is conducted to the water-distributor 52. The sand-dry-stream 46S, now separated out of the sand-wet-stream 50S, passes from the water-separator 31 to the sand-capture-station 47S.

Again, the sand-dry-stream 46S, prior to entering the sand-capture-station 47S, passes through a sand-water-adding-station 53S, in which make-up sand-water 56S from the water-distributor 52 is added to the sand-dry-stream 46S, converting the same into a sand-rewatered-stream 54S. The actual solids/liquids ratio in the sand-rewatered-stream 54S should be the previously-determined optimum ratio, i.e the optimum ratio that maximizes the efficiency of capture of value-minerals from the sand-rewatered-stream 54S.

The rocks-dry-stream 46R passes to the rocks-capture-station 47R, having been rewatered upon passing through the rocks-water-adding-station 53R with rocks-water 56R from the water-distributor 52. The boulders-dry-stream 46B goes straight to disposal, e.g to tailings.

The gravel-plus dry-stream remaining in the fine-trommel 51 encounters a gravel-dry-divider in the form of gravel-apertures 49G in the wall of the fine-trommel 51. The resulting gravel-dry-stream 46G passes to the gravel-capture-station 47G, having been rewatered upon passing through the gravel-water-adding-station 53G with gravel-water 56G from the water-distributor 52. The resulting pebbles-plus dry-stream remains in the fine-trommel 51.

The pebbles-plus dry-stream there encounters a pebbles-dry-divider in the form of pebbles-apertures 49P. The resulting pebbles-dry-stream 46P passes to the pebbles-capture-station 47P, having been rewatered upon passing through the pebbles-water-adding-station 53P with pebbles-water 56P from the water-distributor 52. The resulting stones-dry-stream 46T passes out of the end of the fine-trommel 51.

The stones-dry-stream 46T then passes to the stones-capture-station 47T; again, prior to entering the stones-capture-station 47T, the stones-dry-stream 46T is rewatered, upon passing through a stones-water-adding-station 53T, with stones-water 56T from the water-distributor 52, and it is the stones-rewatered-stream 54T from which the value-minerals are actually captured.

As mentioned, the five water-adding-stations 53 receive make-up water from the water-distributor 52. The operator should see to it that, in respect of each stream, the amount of water added to the dry-stream, at the respective water-adding-station, is the right amount as required to bring the liquids-solids ratio up to the as-determined optimum-ratio for the corresponding one of the capture-station 47.

Figure 3:
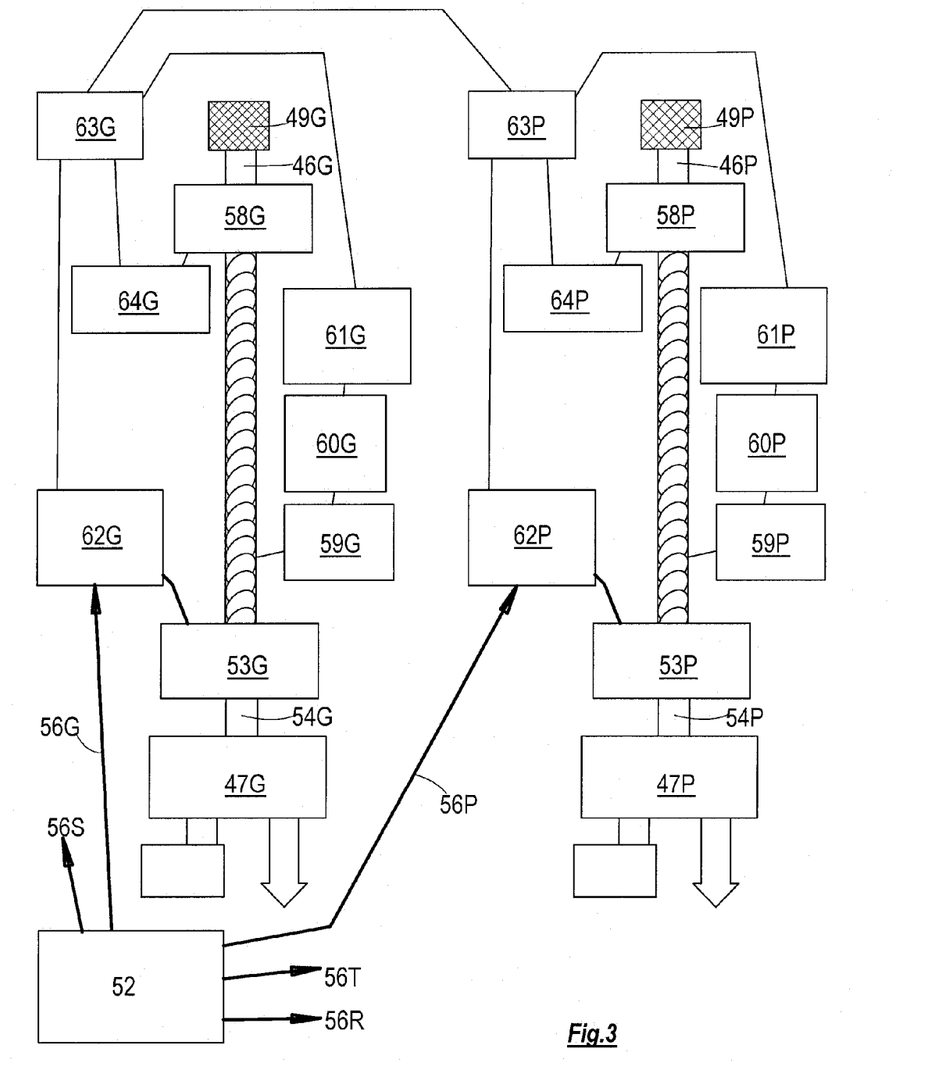
FIG. 3 is a close-up of a part of the installation of FIG. 2, showing further details.

FIG. 3 shows the details of the manner of conveying the particles-sized dry-streams 46 from the dividers to the capture-stations. It should be understood that the systems as described and depicted in FIG. 3 are present in the plants shown in FIGS. 1,2. Only the gravel- and pebbles-dry-streams 46G,46P are shown in FIG. 3, but the depicted systems are provided also in respect of the other dry-streams.

The water-distributor 52 serves to supply each water-adding-station 53G,53P with the make-up loose-water that has been separated from the watery-slurry 21. Gravel- and pebbles-water-flow-controllers 62G,62P are provided in the individual gravel-water 56G and pebbles-water 56P feed-lines, whereby the flow of water to each water-adding-station 53G,53P is independently controlled. That is to say: the flowrate of pebbles-water 56P supplied to the pebbles-water-adding-station 53P can be different from the flowrate of gravel-water 56G supplied to the gravel-water-adding-station 53G. Both water-flowrates are controlled by the water-flow-controllers. In the example, the water-flow controllers are supplied from a common head of water pressure, having respective flow-control-valves by which the flowrate to the water-adding-stations are adjusted. In an alternative, each size-category is provided with its own pump, motor, and pump speed controller, for controlling the flow-rate.

Also, the rate (tonnes per hour) at which the dry-streams 46 leave the trommels is subject to considerable variation. For example: it might happen that, in the morning, most of the particles come through as sand and gravel—but then, in the afternoon, stones and rocks might predominate.

The manner in which the dry-streams 46 are conveyed and transported from the trommels 48,51 to their respective capture-stations 47 may be described as follows. The gravel dry-stream 46G will be described, but (in the plants as shown and described) the system is the same for each dry-stream.

Upon emerging from the gravel-apertures 49G, the gravel-dry-stream 46G drops into a gravel-container in the form of a gravel-bin 58G. From the gravel-bin, a gravel-screw-conveyor 59G then transports the gravel-dry-stream 46G from the gravel-bin 58G to the gravel-water-adding-station 53G. The gravel-dry-stream having there been rewatered, the gravel-rewatered-stream 54G drops (or is pumped) into the gravel-capture-station 47G.

It may be noted that the bins 58 can be small. This is because the materials being stored in the bins is not wet slurry, but is only the solids content (plus the tight-water) is being stored in the bins.

The gravel-screw-conveyor 59G is driven by a powered gravel-conveyor-motor 60G. A gravel-motor-speed-controller 61G controls the speed of the gravel-conveyor-motor 60G (and thus, of the flowrate (tonnes/hr) of the gravel-dry-stream 46G). The flowrate of gravel-water 56G into the gravel-water-adding-station 53G likewise can be varied under the control of a gravel-water-flow-controller 62G.

As mentioned, the systems-engineers have arranged for the flowrate of the gravel-water 56G to be proportional to the flowrate of the gravel-dry-stream 46G. To this end, the gravel-motor-speed-controller 61G and the gravel-water-flow-controller 62G connect to a gravel-computer 63G, which coordinates the two flows. (Though referred to as a 'computer', its function could hardly be more simple.)

The aim is that, if/when the flowrate of the gravel-dry-stream 46G changes, the flowrate of the gravel-water 56G should change in proportion. That being so, despite the changes and variations, the liquids-to-solids ratio of the gravel-rewatered-stream 54G entering the gravel-capture-station 47G remains always the same, i.e remains always the optimum ratio.

A gravel-bin-fill-sensor 64G is provided, for sensing whether the gravel-bin 58G is becoming too full, or not full enough, and this sensor signals its information also to the gravel-computer 63G, with the aim of enabling a change of speed of the gravel-conveyor-motor 60G to deal with the excess, or shortfall. (As described, the designers arrange that when the speed of the gravel-conveyor-motor 60G changes, the flowrate through the gravel-water-flow-controller 62G is adjusted proportionately.)

It will be understood that the speed of the gravel-conveyor 59G of the gravel-dry-stream 46G is in fact an accurate and consistent measure of the flowrate of the gravel-dry-particles. Thus, the flowrates of the respective dry-streams can be accurately measured and controlled by measuring and controlling the motor speeds of the respective conveyors.

It is also very easy for systems-engineers to automate the speed-up of the gravel-conveyor in response to the gravel-bin 58G becoming nearly full. This does not require fine-tuning; for example, the speed control can be a matter of switching between 'fast' and 'slow'. The speed-control 61G for the gravel-conveyor 59G can even be a matter simply of switching the (only-one-speed) conveyor on and off. That is to say: when the gravel-conveyor is switched 'on', the flowrate of the gravel-dry-stream is then always of the predetermined level. Where the gravel feed is controlled in that way, the gravel-water-flow-controller 62G would be switched on/off in time with the on/off switching of the one-speed gravel-conveyor.

As mentioned, the key to efficient capture of value minerals from the watery-slurry is to ensure that the slurry that is fed into the capture-station is at the optimum liquids-to-solids ratio. For most efficient value-capture, the slurry should be kept at this optimum ratio all the time—despite variations in overall flow of slurry, despite variations in the granulometry of the slurry, and despite variations also in the liquids-to-solids ratio of the incoming slurry, over a period of time.

Again, just what constitutes the optimum ratio depends on particle-size, whereby the gravel-optimum-ratio is different from the pebbles-optimum-ratio, and is different from the sand-optimum-ratio.

Absent the present technology, maintaining the liquids-to-solids ratio of a slurry at a constant level despite incoming variations in the ratio, flowrate, etc, poses considerable problems. For one thing, it is difficult to measure the (varying) flowrate of a dry-stream of solids, especially in real-time. But the present technology, more or less eliminates the problem of measuring and controlling the liquids-to-solids ratio, as a problem.

Removing all the loose-water from the incoming flow of watery-slurry creates what may be regarded as a zero-baseline, whereby creating the optimum liquids-solids ratio is simply a matter of adding a proportionate flowrate of water.

In the present technology also, preferably each of the dry-streams is conveyed in such manner that an easy-to-measure parameter of the conveyor apparatus (e.g the speed of the conveyor-motor) is a consistently-reliably-accurate measure of the solids-flowrate. Equally, the flowrate from the water-flow-controller of the added water is a consistently-reliably-accurate measure of the liquids-flowrate. Controlling these two easy-to-control parameters maintains the solids-to-liquids ratio at the optimum level—and does so accurately enough to make the technology commercially worthwhile.

It should be understood that it is important to remove substantially all the loose-water from the watery-slurry 21. Or rather, the thing that is important is that the amount of loose-water that is left in the dry-stream should be constant—and the simplest way of ensuring that constancy is always to remove all the loose-water. If, in the case of e.g the pebbles-dry-stream 46P, there is present in the pebbles-dry-stream a significant amount of residual loose-water, and particularly if that residual amount of loose-water is variable, then the possibility starts to arise that the speed of the pebbles-conveyor 59P is no longer an accurate measure of the flowrate of the pebbles-dry-stream 46P.

Thus, if the dry-stream were to contain significant variable loose-water, the very simple and very accurate correspondence between the flowrate of the added pebbles-water and the flowrate of the pebbles-dry-stream, would or might break down. Therefore, preferably the systems-engineers should see to it that the equipment in the plant is capable of removing all (or all but an insignificant fraction) of the loose-water from the dry-streams.

In the described examples, the capture equipment and machinery, at the capture-stations, is conventional. Diamond has a specific gravity of 3.52, and gold is 19.3. Silica/quartz, which is a large constituent of most rocks, is 2.65. Capture of the value-minerals is carried out in the capture-stations traditionally by centrifuging, for gold, and the use of diamond jigs, for diamonds. Again, the engineers should see to it that the liquids-solids ratio (density) of the slurry passing through the capture-stations 47 is optimized, in the manner as described.

If, for example, the sand-capture-station 47S has been set up for capturing gold from the sand-rewatered-stream 54S by centrifuging, the optimum density at which the sand-rewatered-stream 54S should be fed through the sand-capture-station 47S likely would be different from the optimum density if the sand-capture-station 47S has been set up for capturing diamonds from the sand-rewatered-stream 54S by diamond-jigging.

It can be impractical to provide both kinds of processing in one capture-station 47. However, although gold-centrifuging will not capture diamond particles, often it can be arranged that diamond-jigging will capture gold particles. Typically, it is not worth it to provide processes that aim to capture gold particles smaller than about fifty microns diameter. That is to say: it is more economical to class any particle smaller than fifty microns as worthless clay. Typically, the smallest diamond particles worth capturing would be two-hundred microns (0.02 mm) diameter.

The term 'diameter', herein applied to a particle, does not imply that the particle is spherical, nor is of any particular shape. Rather, the diameter of a particle is the diameter of the smallest circular hole in a thin sheet that the particle could pass through.

The definitions of some of the terms used in this specification are as follows.

The term 'water', herein, refers to the liquids component of the slurry. 'Water', in this sense, might include e.g aqueous solutions, and other liquids besides water, but the predominant content of the slurry is actual water.

The epithets 'small' and 'large', herein, do not indicate size, as such, but rather in a comparative sense; thus a 'small' particle is smaller than a 'large' particle. Also, the word 'small' is applied attributively e.g to a capture-station: this does not mean that the station or the stream is itself small, but rather that the station is used for capturing small particles out of the small-stream.

As mentioned, removing all the loose-water from the watery-slurry provides a zero-baseline for adding the right amount of make-up water that will procure the optimum liquids-solids ratio. However, if the baseline were not zero-loose-water, but, say, thirty-percent-loose-water, that would or might serve equally well, except for the difficulty of knowing whether the thirty-percent was actually thirty, or twenty or forty. Zero is preferred for two reasons: first, reducing the loose-water content to zero is easy to procure and ensure; second, the amount of make-up water to be added to bring the re-watered stream to its optimum density, from zero is necessarily always positive.

Thus, it is preferred to remove all the loose-water from the watery-slurry. Or rather, the engineers should see to it that any loose-water that might be left in the dry-slurry should be insignificant, meaning that any remnant loose-water should be small enough that the procured liquids-solids ratio is near enough to the optimum ratio to make the capture of value-minerals efficient enough to be commercially worthwhile.

Just what constitutes the 'optimum' liquids-solids ratio for a particular plant and operation, is not a matter of looking up the number in a reference book. The optimum liquids-solids ratio depends on the size of the particles from which the value-minerals are to be captured. The optimum ratio depends also, for example, on the particular make/model of the equipment in the capture-station.

As mentioned, even for a particular capture-station, the optimum ratio of liquids-to-solids, when the stream feeding the capture-station is of sand-particles, will or might be different from the optimum ratio when the stream is of gravel-particles, in that same capture-station. The optimum ratio is different again, when the particles are pebbles, and again when the particles are rocks.

But still, it is recognized that the optimum liquids-solids ratio in the particular capture-station likely will not change, once the ratio has been determined for the particular equipment at the capture-station and for the particular range of particle-sizes passing through the capture-station—even though the particle-size ratios and the liquids-solids ratio of the incoming watery-slurry, for example, are both subject to ongoing change.

To determine the optimum ratio, the engineers carry out experiments to determine just what is the liquids-solids ratio that produces the maximum efficiency of capture, for each capture-station used in the plant and operation, and for the range of sizes of particles in the respective streams that are conveyed to those capture-stations.

These experiments can also determine how accurately the densities of the several streams need to be maintained. The experiments should be conducted with the aim of determining the exact optimum liquids-solids ratio (even though exactness might not be achieved, in practice), and also to determine the effect on capture efficiency of deviating slightly (or considerably) from that optimum. The accuracy with which these determinations are made is a matter of comparing the costs of procuring the accuracy, with the benefits arising from the accuracy.

The function of the capture-station is to separate the value-particles from the non-value-particles, by gravity separation, i.e by processes that take advantage of the fact that the value-particles are of greater density (i.e specific gravity) than the non-value particles. The present technology applies to plants and operations where the value-particles are separable on the basis of the specific-gravity of the material of the particles.

A 'wet-divider' station, as that term is used herein, is a station that is structured to apply incoming watery slurry to a mesh of apertures. A wet-divider station divides the watery slurry into a wet-stream and a dry-stream. The wet-stream comprises substantially all the loose-water in the wet-slurry, together with the solid particles in the slurry that are small enough to pass through the apertures. The dry-stream comprises the solid particles that were too large to pass through the apertures.

A wet-divider station is rated according to the size of the particles that can pass through the apertures: for example, a sand-wet-divider station passes particles smaller than two-mm diameter (and the loose-water) in the slurry, but snags particles larger than two mm; a stones-wet-divider station passes particles smaller than nineteen mm diameter (and the loose-water) in the slurry, but snags particles larger than nineteen mm. The structure used to wet-divide the wet-slurry may comprise e.g a conventional trommel or the like.

A 'dry-divider' station, as that term is used herein, is a station that is structured to apply dewatered slurry (being slurry from which all loose-water has already been removed) to apertures. A dry-divider divides the watery slurry into a small-dry-stream and a large-dry-stream. The small-dry-stream comprises the solid particles small enough to pass through the apertures, and the large-dry-stream comprises the solid particles that did not pass through the apertures.

A dry-divider station also is rated according to the size of the particles that can pass through the apertures: for example, a gravel-dry-divider station passes dry particles smaller than twelve mm diameter, but blocks particles larger than twelve mm; a rocks-dry-divider station passes particles smaller than thirty mm diameter, but blocks particles larger than thirty mm. The structure used to dry-divide the dewatered slurry may comprise e.g a conventional trommel or the like. A trommel can be configured to include a wet-divider station and a dry-divider station, in the same structure.

In short: a wet-divider divides a wet-stream into a wet stream and a dry stream; a dry-divider divides a dry stream into two dry streams.

A 'water-separator' station, as that term is used herein, is a station that is structured to apply an incoming watery-slurry, or to apply a wet-stream, to a water-removal structure. The water-separator-station is effective, like the wet-divider station, to divide the incoming stream (slurry) into a wet-stream and a dry-stream. But now, even the small particles have been so thoroughly removed from the outgoing wet-stream that the size of particles that remain in the wet-stream are so small as to be of no value, or at least to be not worth the expense of separating them from the water. Typically, gold particles smaller than about sixty microns are not worth extracting. (Of course, that number changes with the price of gold.) Most of the particles that remain in the wet-stream are silt and clay particles of e.g fifty microns and smaller. Systems-designers will understand that the water-removal structure used to separate all but the very smallest particles from the water include e.g hydrocyclones, high-frequency vibrating screens, and the like.

In the exemplary plants and operations, the hierarchy of sizes of the particles has been described by the names sand, gravel, pebbles, stones, rocks, boulders. Specific examples of particle sizes to which those terms can be applied have been given, as numerical values. In the attached claims, the basic hierarchy of sizes is defined by the words 'small' and 'large', and in more detail by the words 'small', 'medium', 'coarse', 'large'. It is intended that these words should be construed to be generic to the names 'sand', 'gravel', etc.

Some of the components and features in the drawings have been given numerals with letter suffixes. The numeral without the suffix has been used herein to indicate the components generically or collectively.

The scope of the patent protection sought herein is defined by the accompanying claims. The apparatuses and procedures shown in the accompanying drawings and described herein are examples.

The numerals as used in the drawings are summarized as:
20 processing station
21 incoming watery-slurry
(FIG. 1)
24 trommel
25 sand-apertures
26 sand-wet-stream
27 gravel-plus-dry-stream
28 gravel-apertures
30 gravel-dry-stream
31 water-separator
32 loose-water-stream
34 sand-dry-stream
35 water-distributor
36 sand-capture-station
37 sand-water-adding-station
38 make-up sand-water
39 sand-rewatered-stream
40 pebbles-plus-dry-stream
41 gravel-capture-station
42 gravel-water-adding-station
43 make-up gravel-water
45 gravel-rewatered-stream
(FIG. 2)
46 six dry-streams
46S,46G,46P,46T,46R,46B sand-, gravel-, pebbles-, stones-, rocks-, boulders-dry-streams
47 five capture-stations
47S,47G,47P,47T,47R,47B sand-, gravel-, pebbles-, stones-, rocks-, boulders-capture-stations
48 coarse-trommel
49 five apertures in trommel walls
49S,49G,49P,49T,49R sand-, gravel-, pebbles-, stones-, rocks-apertures
50 two wet-streams
50T,50S stones-, sand-wet-streams
51 fine-trommel
52 water-distributor
53 five water-adding-stations
53S,53G,53P,53T,53R sand-, gravel-, pebbles-, stones-, rocks-water-adding-stations
54 five rewatered-streams
54S,54G,54P,54T,54R sand-, gravel-, pebbles-, stones-, rocks-rewatered-streams
56 five water streams
56S,56G,56P,56T,56R sand-, gravel-, pebbles-, stones-, rocks-water
(FIG. 3)
58 five bins (containers)
58S,58G,58P,58T,58R sand-, gravel-, pebbles-, stones-, rocks-bins
59 five screw-conveyors
59S,59G,59P,59T,59R sand-, gravel-, pebbles-, stones-, rocks-screw-conveyors
60 five conveyor-motors
60S,60G,60P,60T,60R sand-, gravel-, pebbles-, stones-, rocks-conveyor-motors
61 five motor-speed-controllers
61S,61G,61P,61T,61R sand-, gravel-, pebbles-, stones-, rocks-motor-speed-controllers
62 five water-flow-controllers
62S,62G,62P,62T,62R sand-, gravel-, pebbles-, stones-, rocks-water-flow-controllers
63 five computers
63S,63G,63P,63T,63R sand-, gravel-, pebbles-, stones-, rocks-computers
64 five bin-fill-sensors
64S,64G,64P,64T,64R sand-, gravel-, pebbles-, stones-, rocks-bin-fill-sensors.

The invention claimed is:

1. A procedure for recovering value-minerals from a watery-slurry, including: where the watery slurry comprises at least 50% water,
   (b) removing substantially all loose-water from the water-slurry;
   (c) dividing the water-slurry, by particle size, into at least two streams, being:
      (a) a first dewatered slurry-stream, termed the small-dry-stream (34), essentially comprising smaller-sized particles, and
      (b) a second dewatered slurry-stream, termed the large-dry-stream (30), essentially comprising larger-sized particles;
   (d) providing an operable small-water-adding-station, and
      i. operating the small-water-adding-station to add make-up water to the small-dry-stream, whereby the small-dry-stream becomes a small-wet-stream;
      ii. providing an operable small-capture-station (36);
      iii. determining a small-optimum-ratio, defined as a ratio of solids-to-liquids that, being present in a slurry passing through the small-capture-station, maximizes efficiency of capture of value-minerals;
      iv. adding the make-up water in such quantity as to bring the solids-to-liquids ratio in the small-wet-stream up to the small-optimum-ratio; after adding the make-up water,
      v. then passing the small-wet-stream through the small-capture-station;
      vi. operating the small-capture-station to isolate and collect small value-minerals;
   (e) providing an operable large-water-adding-station, and
      i. operating the large-water-adding-station to add make-up water to the large-dry-stream, whereby the large-dry-stream becomes a large-wet-stream;
      ii. providing an operable large-capture-station (41);
      iii. determining a large-optimum-ratio, defined as a ratio of solids-to-liquids that, being present in a slurry passing through the large-capture-station, maximizes efficiency of capture of value-minerals;

iv. adding the make-up water in such quantity as to bring the solids-to-liquids ratio in the large-wet-stream up to the large-optimum-ratio;
v. after adding the make-up water, then passing the large-wet-stream through the large-capture-station;
vi. operating the large-capture-station to isolate and collect large value-minerals; and
(f) where the small-optimum-ratio is different from the large-optimum-ratio.

2. The procedure for recovering value-minerals from a watery-slurry as claimed in claim 1, including using the separated loose-water as, or as a component of, the make-up water (38).

3. The procedure for recovering value-minerals from a watery-slurry as claimed in claim 2, including:
(a) providing an operable water-separator (25, 31), which is effective when operated, and upon receiving water-slurry, to separate substantially all loose-water therefrom;
(b) providing an operable small-water-adding-station (37), which is effective when operated to receive loose-water from the water-separator and to add the same, as make-up water, to the small-dry-stream;
  i. operating the water-separator, passing loose-water from the water-separator to the small-water-adding-station, and
  ii. operating the small-water-adding-station;
(c) providing an operable large-water-adding-station (41), which is effective when operated to receive loose-water from the water-separator and to add the same, as make-up water, to the large-dry-stream;
  i. operating the water-separator,
  ii. passing loose-water from the water-separator to the large-water-adding-station, and
  iii. operating the large-water-adding-station.

4. The procedure for recovering value-minerals from a watery-slurry as claimed in claim 3, including: providing a water-distributor, and using the same:
(a) to receive the loose-water from the water-separator; and
(b) to distribute some of the loose-water to the small-water-adding-station and some of the loose-water to the large-water-adding-station.

5. The procedure for recovering value-minerals from a watery-slurry as claimed in claim 4, including:
(a) providing the water-separator in two or more stages, being or including a coarse-separator (49T) and a fine-separator (49S, 31);
(b) feeding the incoming watery-slurry into and through the coarse-separator, thereby creating a coarse-wet-stream (50T) and a coarse-dry-stream;
(c) feeding the coarse-wet-stream into and through the fine-separator, thereby creating a fine-wet-stream (50S) and a fine-dry-stream (46S);
(d) feeding the fine-wet-stream into the water-distributor; feeding the fine-dry-stream into the small-water-adding-station.

6. The procedure for recovering value-minerals from a watery-slurry as claimed in claim 1, including: providing an operable dry-divider (25, 31), which
(a) is effective when operated, and upon receiving a dry-stream, to divide the dry-stream into the small-dry-stream (34) and the large-dry-stream (30);
(b) feeding the small-dry-stream into the small-capture-station; and
(c) feeding the large-dry-stream into the large-capture-station.

7. The procedure for recovering value-minerals from a watery-slurry as claimed in claim 1, including:
(a) dividing the watery-slurry, by particle size, into at least four streams, being:
  (a) the small-dry-stream (46S);
  (b) a medium-dry-stream (46G), essentially comprising particles of medium-size;
  (c) a coarse-dry-stream (46P), essentially comprising particles sized between medium and large;
  (d) the large-dry-stream (46T);
(b) providing an operable medium-water-adding-station, and
  A. operating the same to add make-up water to the medium-dry-stream, whereby the medium-dry-stream becomes a medium-wet-stream;
(c) providing an operable medium-capture-station;
  i. determining a medium-optimum-ratio, defined as a ratio of solids-to-liquids that, being present in slurry passing through the medium-capture-station, maximizes efficiency of capture of value-minerals;
  ii. adding the make-up water in such quantity as to bring the solids-to-liquids ratio in the medium-wet-stream up to the medium-optimum-ratio; after adding the make-up water,
  iii. then passing the medium-wet-stream through the medium-capture-station;
  iv. operating the medium-capture-station to isolate and collect medium value-minerals;
(d) providing an operable coarse-water-adding-station, and operating the same to add make-up water to the coarse-dry-stream, whereby the coarse-dry-stream becomes a coarse-wet-stream;
  i. providing an operable coarse-capture-station;
  ii. determining a coarse-optimum-ratio, defined as a ratio of solids-to-liquids that, being present in slurry passing through the coarse-capture-station, maximizes efficiency of capture of value-minerals;
  iii. adding the make-up water in such quantity as to bring the solids-to-liquids ratio in the coarse-wet-stream up to the coarse-optimum-ratio;
  iv. after adding the make-up water, then passing the coarse-wet-stream through the coarse-capture-station;
  v. operating the coarse-capture-station to isolate and collect coarse value-minerals.

8. The procedure for recovering value-minerals from a watery-slurry as claimed in claim 1, including:
(a) providing an operable small-conveyor (59G), which is effective when operated to feed the small-dry-stream into and through the small-water-adding station;
  i. providing an operable small-conveyor-flow-controller, which is effective when operated to control the feed-rate at which the small-dry-stream passes along the small-conveyor;
  ii. providing an operable small-water-flow-controller, which is effective when operated to control the flowrate of water added to the small-dry-stream at the small-water-adding-station;
  iii. operating the small-conveyor-flow-controller to create a feed-rate-F of the small-dry-stream in the small-conveyor;
  iv. operating the small-water-controller to coordinate the flowrate of water to the feed-rate-F, thereby to maintain the small solids-to-liquids ratio at the small-optimum-ratio;

(b) providing an operable large-conveyor (59P), which is effective when operated to feed the large-dry-stream into and through the large-water-adding station;
  i. providing an operable large-conveyor-controller, which is effective when operated to control the feed-rate at which the large-dry-stream passes along the large-conveyor;
  ii. providing an operable large-water-controller, which is effective when operated to control the flowrate of water added to the large-dry-stream at the large-water-adding-station;
  iii. operating the large-conveyor-controller to create a feed-rate-F of the large-dry-stream in the large-conveyor;
  iv. operating the large-water-controller to coordinate the flowrate of water to the feed-rate-F, thereby to maintain the large solids-to-liquids ratio at the large-optimum-ratio.

9. The procedure for recovering value-minerals from a watery-slurry as claimed in claim 8, including:
  (a) providing a small-bin (58G), and
    i. feeding the small-dry-stream (46G) into the small-bin;
    ii. using the small-conveyor to feed the small-dry-stream from the small-bin to the small-water-adding-station;
  (b) providing a large-bin (58P), and
    i. feeding the large-dry-stream (46P) into the large-bin;
    ii. using the large-conveyor to feed the large-dry-stream from the large-bin to the large-water-adding-station.

10. The procedure for recovering value-minerals from a watery-slurry as claimed in claim 1, where the incoming watery-slurry is limited to a flowrate of less than five-hundred tonnes per hour.

11. An apparatus for recovering value-minerals from a watery-slurry comprising at least 50% water, including:
  (a) a water-separator, for separating loose-water from the watery-slurry;
  (b) a dry-divider, for dividing the dewatered slurry into a small-dry-stream and a large-dry-stream;
  (c) a small-water-adding station for adding a small-waterflow to the small-dry-stream, thereby creating a small-rewatered-stream;
  (d) a small-water-flow-controller, for
    i. controlling the flowrate at which the small-waterflow is added to the small-dry-stream in the small-water-adding-station, and
    ii. thereby for maintaining the density of the small-rewatered-stream at a small-optimum-density;
  (e) a small-capture-station for capturing value-minerals from the small-rewatered-stream;
  (f) a large-water-adding station for adding a large-waterflow to the large-dry-stream, thereby creating a large-rewatered-stream;
  (g) a large-water-flow-controller, for
    i. controlling the flowrate at which the large-waterflow is added to the large-dry-stream in the large-water-adding-station, and
    ii. thereby for maintaining the density of the large-rewatered-stream at a large-optimum-density;
  (h) a large-capture-station for capturing value-minerals from the large-rewatered-stream;
  (i) the apparatus is so structured as to enable the small-optimum-density to be different from the large-optimum-density.

12. An apparatus as claimed in claim 11, including
  (a) conduits for collecting the separated loose-water, and
  (b) conduits for conducting some of the separated loose-water to the small-water-adding-station, and some separated to the large-water-adding-station.

* * * * *